Patented July 26, 1927.

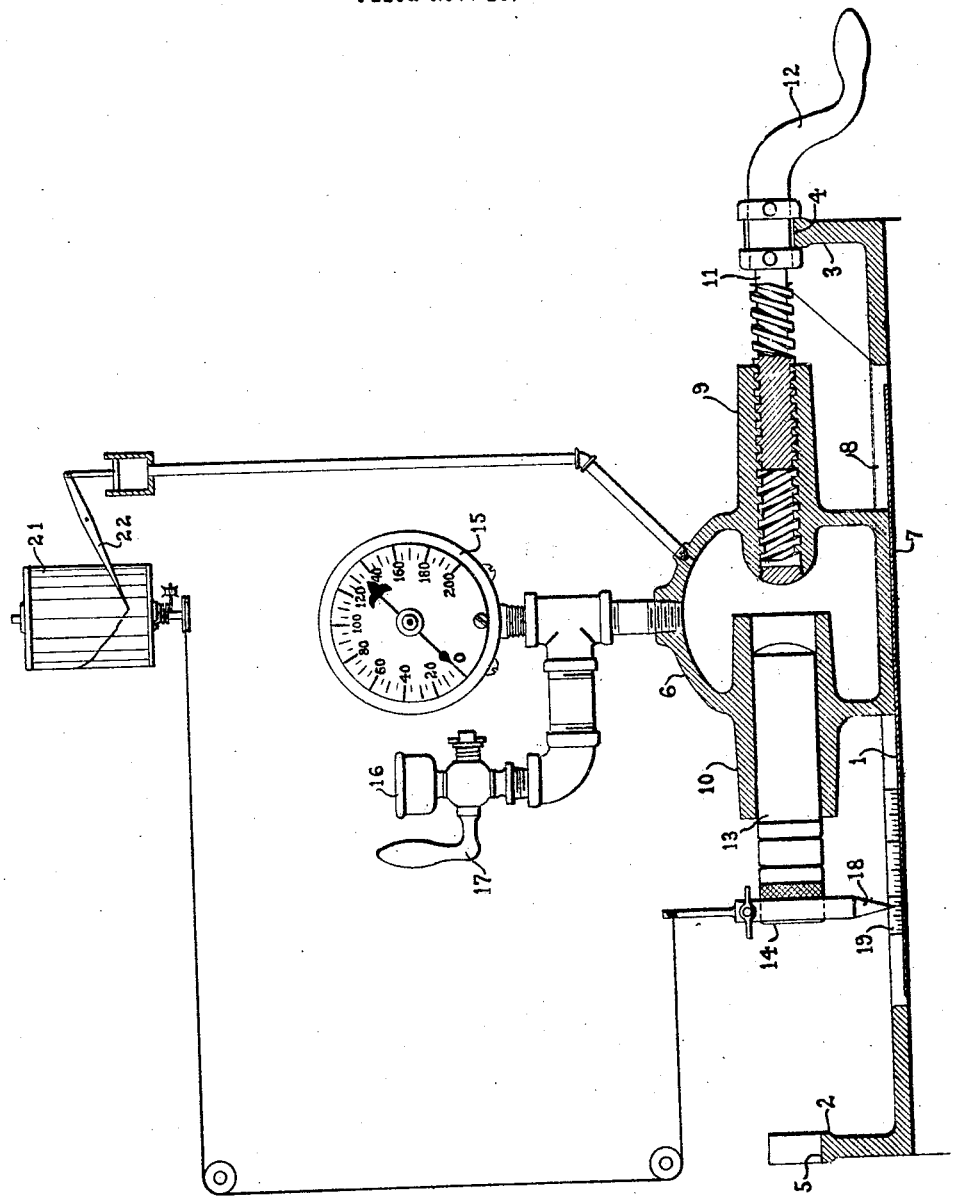

1,637,062

UNITED STATES PATENT OFFICE.

HERMAN J. TAYLOR, OF MILWAUKEE, WISCONSIN, ASSIGNOR TO THE CUTLER-HAMMER MFG. CO., OF MILWAUKEE, WISCONSIN, A CORPORATION OF WISCONSIN.

TESTING APPARATUS FOR SOLENOIDS AND THE LIKE.

Application filed November 13, 1920. Serial No. 423,846.

This invention relates to testing apparatus for solenoids and the like.

In designing and constructing solenoids and analogous power devices it is of great practical importance that the operative characteristics of such devices be readily ascertainable, whereas great difficulty has heretofore been encountered in adequately testing such devices by ordinary methods.

An object of the invention is that of providing means enabling ready and accurate testing of the operative characteristics of such devices.

Another object is that of providing apparatus enabling accurate ascertainment of the forces developed by solenoids and analogous devices at different points throughout the working range thereof.

Another object is that of providing exceedingly simple, durable and readily operable apparatus enabling such testing of devices of the character aforementioned under conditions closely approximating the actual working conditions thereof.

Various other objects and advantages will hereinafter appear.

According to the present invention it is proposed to subject a suitable indicating mechanism to continuous influence of the total developed force tending to effect relative movement of the elements of the device to be tested, certain of said elements being maintained stationary and other of said elements being caused to move progressively and regulably throughout all or a portion of the working range, means being also provided for indicating the stages of such movement corresponding with instantaneous readings of said former indicating device. Also, if desired, means may be provided for recording graphically the values assumed by such actuating force within the range of operation of the device undergoing test.

The accompanying drawing, consisting of a single figure, is a side elevational view, partly in section, of a preferred embodiment of the invention, certain features being also illustrated schematically.

Referring to the drawing, the same illustrates a support having a plane surface 1, preferably horizontal, and a pair of abutments 2 and 3 having substantially parallel adjacent faces extending at right angles to said surface. The abutment 3 is provided near its free end with a bearing 4 having its axis arranged at right angles to the adjacent surface of said abutment and parallel to the surface 1 of the support but spaced a material distance from the latter. Said bearing is also preferably of open formation. The abutment 2 may also be provided with a bearing 5 similar to the bearing 4 and arranged in axial alignment therewith.

A fluid container 6 is located between said abutments and movable relatively thereto, said container having a plane exterior surface 7 adapted to bear against the surface 1 of said support for guiding the movement of said container, whereas for a like purpose said support is preferably provided with flanges 8 forming a channel to receive said container. Said container is further provided with aligned sleeves 9 and 10 projecting in opposite directions therefrom and laterally spaced from the surface 7 a distance suitable for axial alignment with the bearing 4. The sleeve 9 is interiorly screw threaded and separated from the interior of the container while the sleeve 10 is interiorly smooth and is moreover in direct communication with the interior of the container.

A screw shaft 11 is arranged to co-operate with the threaded interior of the sleeve 9, said shaft having a straight portion extending outwardly beyond said sleeve and adapted to rest within the bearing 4. Said shaft is further provided with opposed shoulders adapted to engage the abutment 3 upon opposite sides of said bearing for preventing axial movement of the former relative to the latter. Said shaft is also provided with an integral operating crank 12 providing for rotation thereof. A plunger 13 is arranged within the sleeve 10 and adapted to make a close working fit with the interior thereof, said plunger having an end portion 14 normally projecting beyond the outer end of said sleeve and toward the abutment 2.

A pressure gauge 15, of known construction, is operatively connected with the interior of the container 6. A priming cup 16 or similar device having a cut off 17 is further provided for introducing oil or other substantially incompressible fluid within the container, said container and gauge as well as all communicating passages being preferably completely filled with such fluid.

The free end 14 of plunger 13 is preferably provided with an adjustable pointer 18 while the adjacent portion of the support is provided with a scale 19, said elements serving to indicate the amount of travel of the plunger. Optionally the shaft 11 and abutment 4 may be similarly provided respectively with a pointer and a scale, the intervals of which bear a known relation to the thread pitch of said shaft, whereby said scale affords an indication of the amount of axial travel of the container under different degrees of rotary movement of said shaft.

The operation of the aforedescribed mechanism may be stated as follows. The solenoid or other device to be tested being arranged upon the support with its stationary element closely engaging the abutment 2 and its movable element extending in the direction of movement thereof toward and in alignment with the plunger 13, the shaft 11 is then rotated by means of its handle for moving the container 6 and its attached parts toward the solenoid until the plunger 13 is brought into intimate contact with the movable element of such solenoid. The pointer 18 is thereafter adjusted to register zero on its associated scale. Thereafter the solenoid is energized, the force developed thereby tending to push in the plunger 13 and such force being transmitted in the form of pressure through the column of fluid to the pressure gauge 15, the indication of which is a measure of the value of such force. Thereafter the shaft 11 is rotated through a suitable angle for permitting the movable element of the solenoid to advance a known distance in the direction of the force actuating the same, whereupon any variation in the value of such force is at once indicated in the reading of the pressure gauge.

The foregoing steps are repeated throughout the working range of the solenoid to be tested, or throughout any portion of such range the characteristics of which it is desired to ascertain, the successive readings of the gauge being noted and also the total travel of the plunger 13 preceding each of such readings. By using such summative movements of said plunger as abscissæ and using the successive gauge readings as ordinates the force characteristics of the device may be readily plotted.

Since solenoids and other devices which it may be desired to test in the aforedescribed manner are frequently provided with plungers extending in opposite directions therefrom, the aforedescribed bearings 5 in the abutment 2 may be advantageously employed for purposes of accurate positioning of the device to be tested.

Obviously by slight modification of the aforedescribed structure the same may be adapted to indicate pull rather than thrust of the solenoid or other device undergoing test.

A proposed apparatus for recording graphically the values assumed by the solenoid actuating force within the working range thereof comprises as illustrated a record blank 21 arranged to be moved in synchronism with the movement of the plunger 13 and a pen or other recording instrument 22 arranged to be actuated in accordance with variations in the fluid pressure within the container 6 for movement substantially at right angles to the direction of movement of the surface of said blank.

While the foregoing description applies particularly to the use of the device for testing solenoids, it is nevertheless obvious that the same may with similar advantages be utilized for testing other devices of somewhat similar character.

What I claim as new and desire to secure by Letters Patent is:

1. Apparatus for testing solenoids and other power devices comprising an indicator, means for subjecting the same to influence in accordance with the force developed by such device tending to effect relative movement of its parts and adjustable means associated with said last-mentioned means for controlling the degree of relative movement of such parts.

2. Apparatus for testing solenoids and other power devices, comprising an element to be subjected to continued influence in accordance with the value of the force developed by the device undergoing test and means for indicating instantaneous values of the influence so exerted upon said element corresponding to known points within the working range of the device undergoing test.

3. Apparatus for testing the force developed by solenoids and other power devices tending to effect relative movement of parts thereof, comprising means for converting such force into fluid pressure, and means for indicating the instantaneous values of such pressure upon preselected degrees of relative movement within the working range of the device undergoing test.

4. Apparatus for ascertaining the force developed at different stages of the working range of solenoids and other power devices whereof the developed force tends to effect relative movement of parts thereof, comprising means movable with certain of such relatively moving parts for converting such force into fluid pressure, means for indicating the value of such pressure continuously and means for arresting such relative movement of said parts at the aforementioned stages selectively.

5. In a testing device for solenoids and the like, the combination with means for supporting the solenoid or the like and for positioning and retention of one of the relatively movable elements thereof, of a closed container having a part to subject the interior of said container to pressure proportional to the force of the solenoid or the like tending to effect movement of an element thereof relative to said former element, means for indicating the value of such pressure and means associated with said container and said support for controlling relative movement of said elements of such solenoid or the like.

6. In a testing device for solenoids and the like, the combination with a support having opposed projecting abutments, certain of said abutments being adapted to co-operate with an element of such solenoid or the like for limiting movement of such element, a closed container carried by said support, a screw shaft to co-operate with said container and another of said abutments for moving and holding said container relatively to said support, said container having means subjecting the interior thereof to pressure variable directly with the force exerted by such solenoid or the like and a device for indicating the value of such pressure.

7. The method of testing solenoids and similar power devices which comprises effecting operation thereof under conditions insuring relative movement of parts thereof successively through predetermined portions of a given maximum range, and measuring the corresponding instantaneous values of the force tending to cause such movement.

8. The method of ascertaining the developed force tending to effect relative movement of the elements of a power device, which comprises effecting operation of the device under conditions insuring intermittent preselected degrees of relative travel of its elements, and measuring the corresponding instantaneous values of such developed force.

In witness whereof, I have hereunto subscribed my name.

HERMAN J. TAYLOR.